(12) United States Patent
Liu (10) Patent No.: US 8,226,102 B2
(45) Date of Patent: Jul. 24, 2012

(54) BABY TRAILER SAFETY STRUCTURE THAT PROHIBITS BABY FROM STANDING UP

(76) Inventor: Cheh-Kang Liu, Taipei (TW)

( * ) Notice: Subject to any disclaimer, the term of this patent is extended or adjusted under 35 U.S.C. 154(b) by 178 days.

(21) Appl. No.: 12/907,001

(22) Filed: Oct. 18, 2010

(65) Prior Publication Data

US 2012/0091689 A1    Apr. 19, 2012

(51) Int. Cl.
*B62K 27/00* (2006.01)
(52) U.S. Cl. .............. 280/204; 280/476.1; 280/292; 280/202; 280/647; 280/650; 280/658
(58) Field of Classification Search ............. 280/476.1, 280/204, 292, 656, 202, 647, 650, 657, 658, 280/288.4, 291
See application file for complete search history.

(56) References Cited

U.S. PATENT DOCUMENTS

| 5,947,497 | A  | * | 9/1999  | Hsu ............................... 280/204 |
|-----------|----|---|---------|---------------------------------------------|
| 6,896,275 | B1 | * | 5/2005  | Liu ............................... 280/204 |
| 6,959,938 | B1 | * | 11/2005 | Liu ............................... 280/204 |
| 7,341,265 | B1 | * | 3/2008  | Liu ............................... 280/204 |
| 7,354,058 | B2 | * | 4/2008  | Chou .......................... 280/651 |
| 7,387,310 | B1 | * | 6/2008  | Liu ............................... 280/642 |
| 2002/0074764 | A1 | * | 6/2002 | Allen et al. ................ 280/204 |
| 2002/0096857 | A1 | * | 7/2002 | Valdez et al. .............. 280/293 |

* cited by examiner

*Primary Examiner* — Lesley D Morris
*Assistant Examiner* — Michael Stabley
(74) *Attorney, Agent, or Firm* — Jackson IPG PLLC (57) ABSTRACT

A baby trailer safety structure includes a safety block affixed to one sidebar of the bottom frame unit of the baby trailer opposite to the other sidebar that is mounted with a trailer bar. The safety block has a sloping peripheral wall with an arc face to prohibit a young child carrying in the baby trail from standing up on the associating sidebar to collapse the baby trailer, enhancing the safety level of the baby trailer.

14 Claims, 10 Drawing Sheets

BABY TRAILER SAFETY STRUCTURE THAT PROHIBITS BABY FROM STANDING UP

BACKGROUND OF THE INVENTION

1. Field of the Invention

The present invention relates to a baby trailer and more specifically, to a baby trailer safety structure, which has a safety block affixed to one sidebar of the bottom frame unit to prohibit a young child carrying in the baby trail from standing up on the associating sidebar to collapse the baby trailer, enhancing the safety level of the baby trailer.

2. Description of the Related Art

Figure 1:
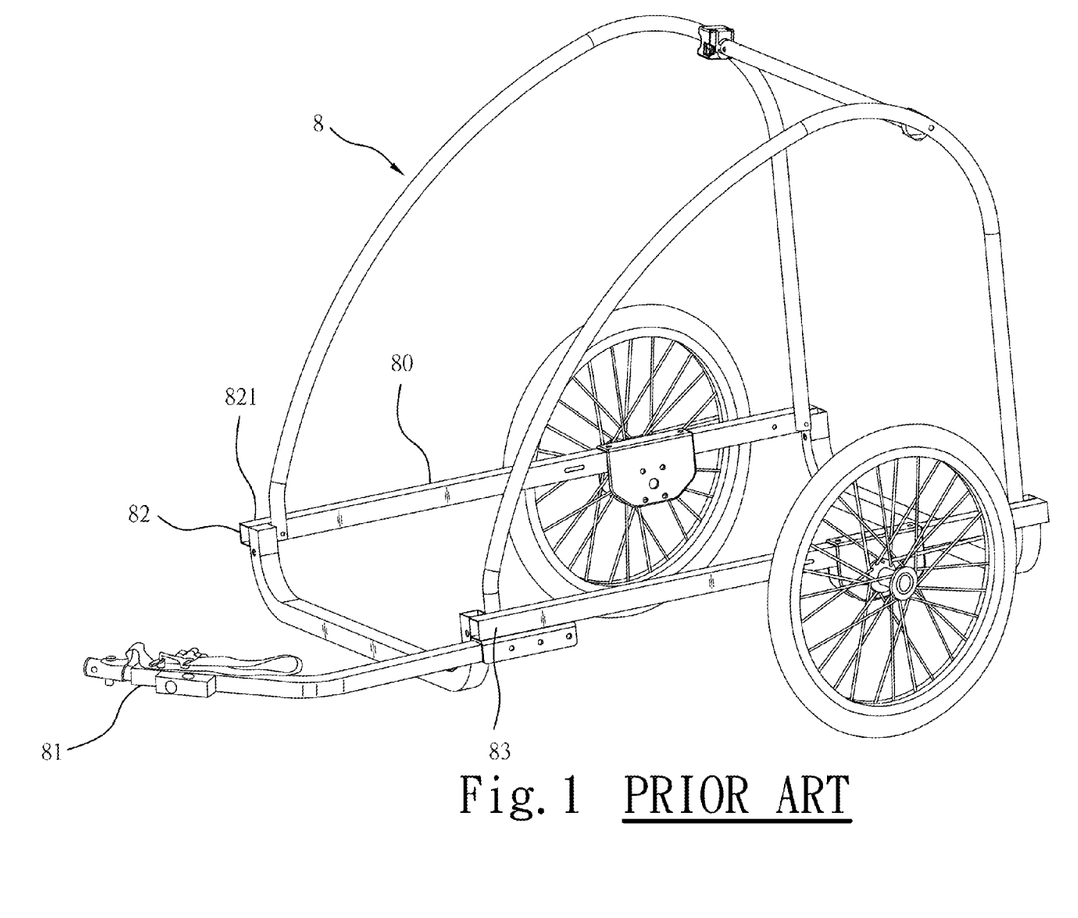
FIG. 1 is an elevational view illustrating the frame structure of a baby trailer according to the prior art.

A conventional baby trailer 8, as shown in FIG. 1, is adapted for carrying a baby, having a trailer bar 81 connectable to a bicycle (not shown) for enabling an adult to trail the baby trailer 8 when riding the bicycle.

Figure 2:
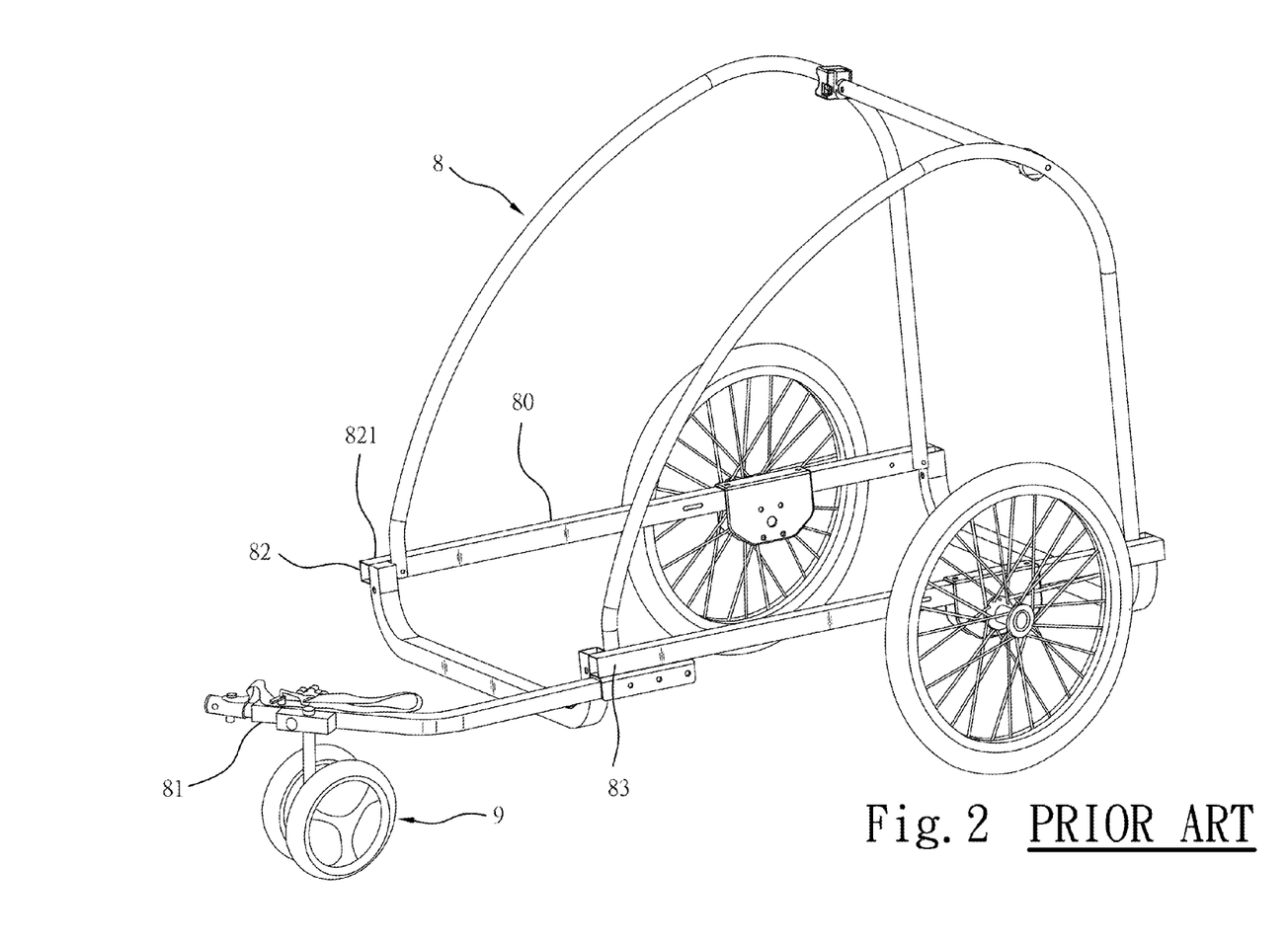
FIG. 2 corresponds to FIG. 1, illustrating a front wheel assembly mounted on the bottom side of the trailer bar.

Further, a front wheel assembly 9 may be provided at the bottom side of the trailer bar 81 (see FIG. 2) so that the baby trailer 8 can be used as a baby cart. However, if a young child carrying in the baby trailer 8 presses the leg on the front end 821 of the sidebar 82 of the bottom frame 80 or stands up on the sidebar 82 that is opposite to the sidebar 83 carrying the trailer bar 81, the center of gravity of the baby trailer 8 will be shifted and become unbalanced, and the baby trailer 8 may collapse.

SUMMARY OF THE INVENTION

The present invention has been accomplished under the circumstances in view. It is the main object of the present invention to provide a baby trailer safety structure, which comprises a safety block affixed to one sidebar of the bottom frame unit of the baby trailer opposite to the other sidebar that is mounted with a trailer bar. The safety block has a sloping peripheral wall with an arc face to prohibit a young child carrying in the baby trail from standing up on the associating sidebar to collapse the baby trailer, enhancing the safety level of the baby trailer.

Further, when a test block member is pressed vertically downwardly onto the safety block during a safety test, the test block member cannot be kept in position and will slope downwardly out of the safety block, and therefore the safety block meets fully the test standards.

DETAILED DESCRIPTION OF THE INVENTION

Figure 3:
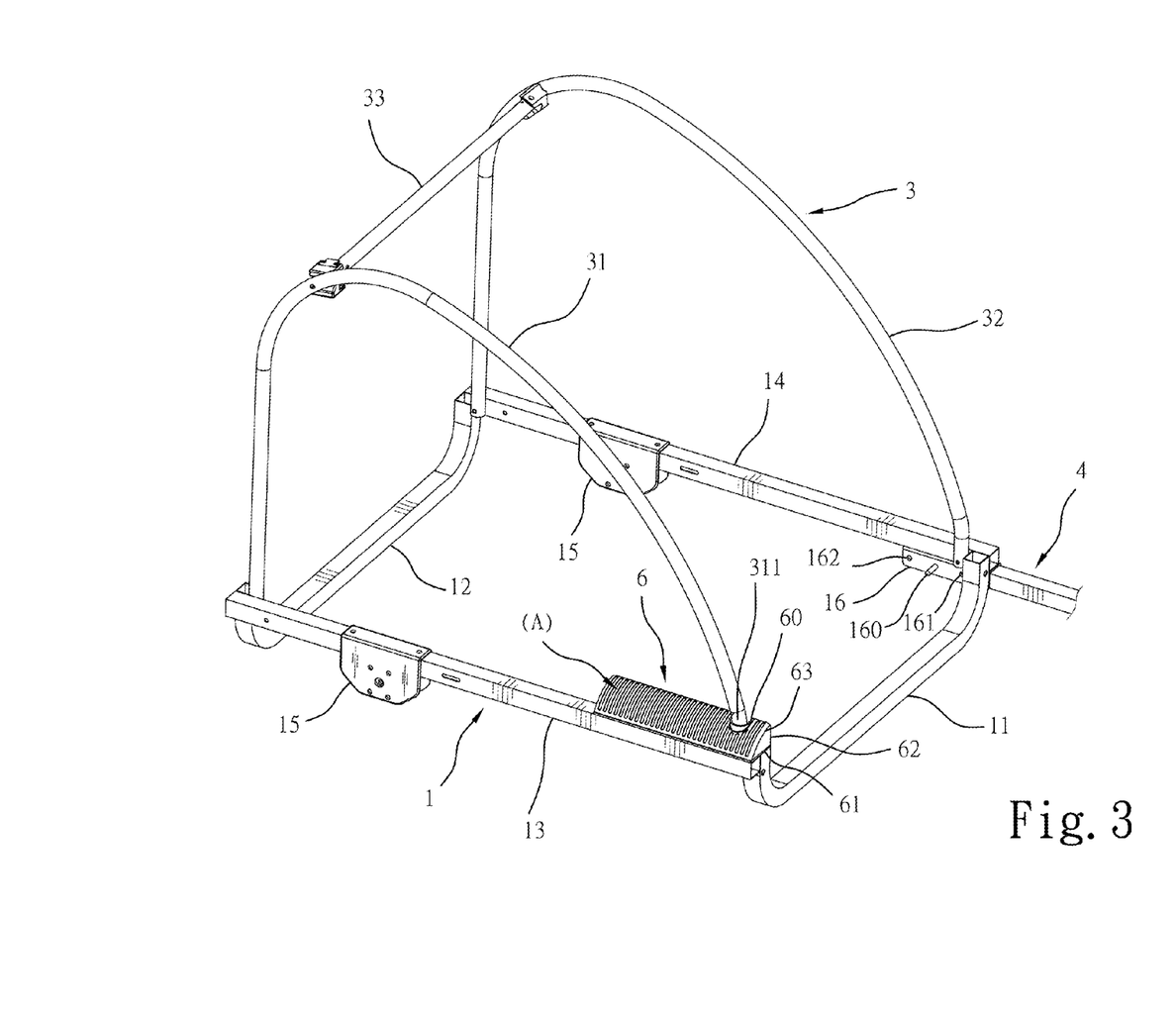
FIG. 3 is an elevational view illustrating the frame structure of a baby trailer safety structure in accordance with the present invention.
Figure 4:
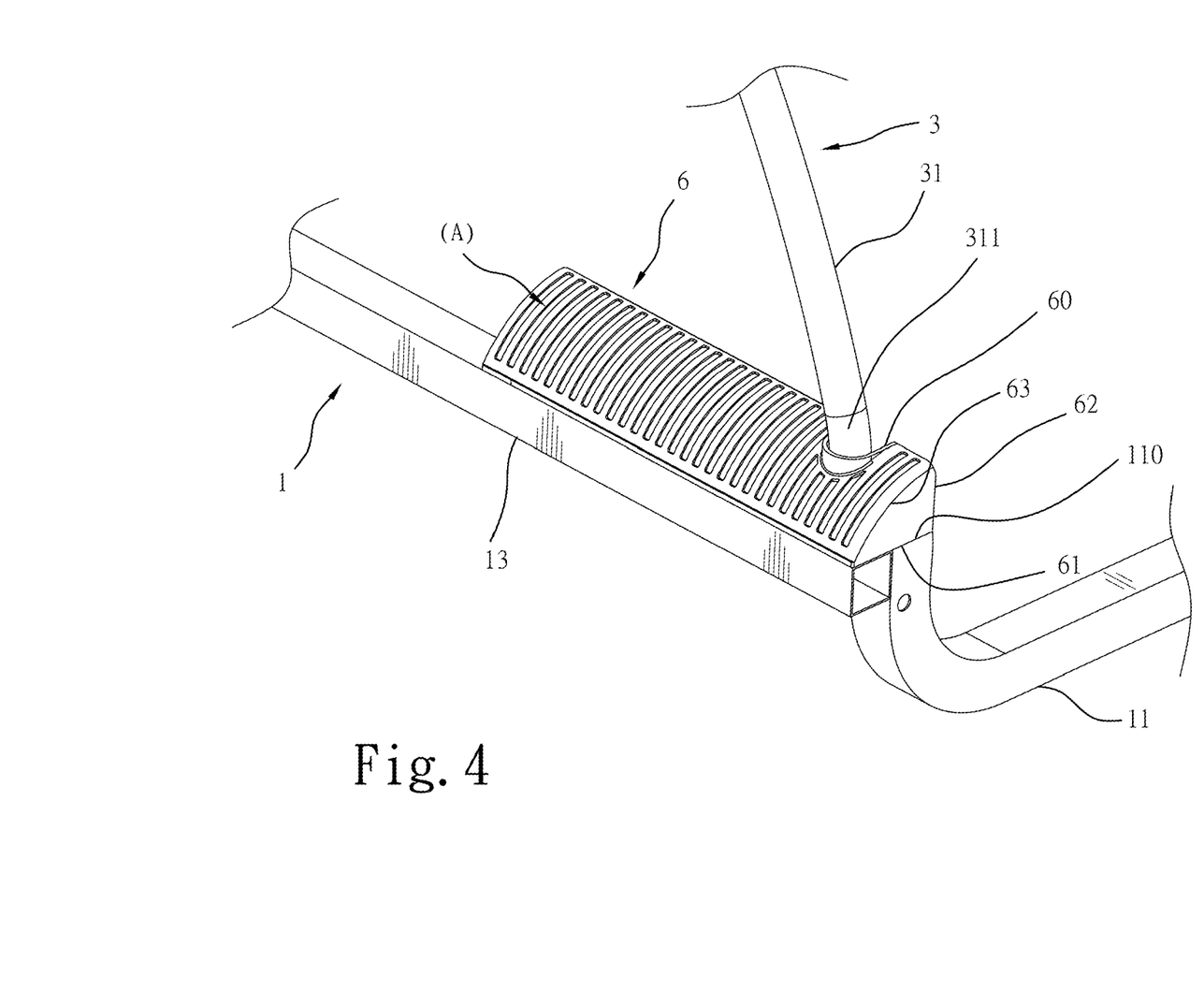
FIG. 4 is an enlarged view of a part of FIG. 3.
Figure 5:
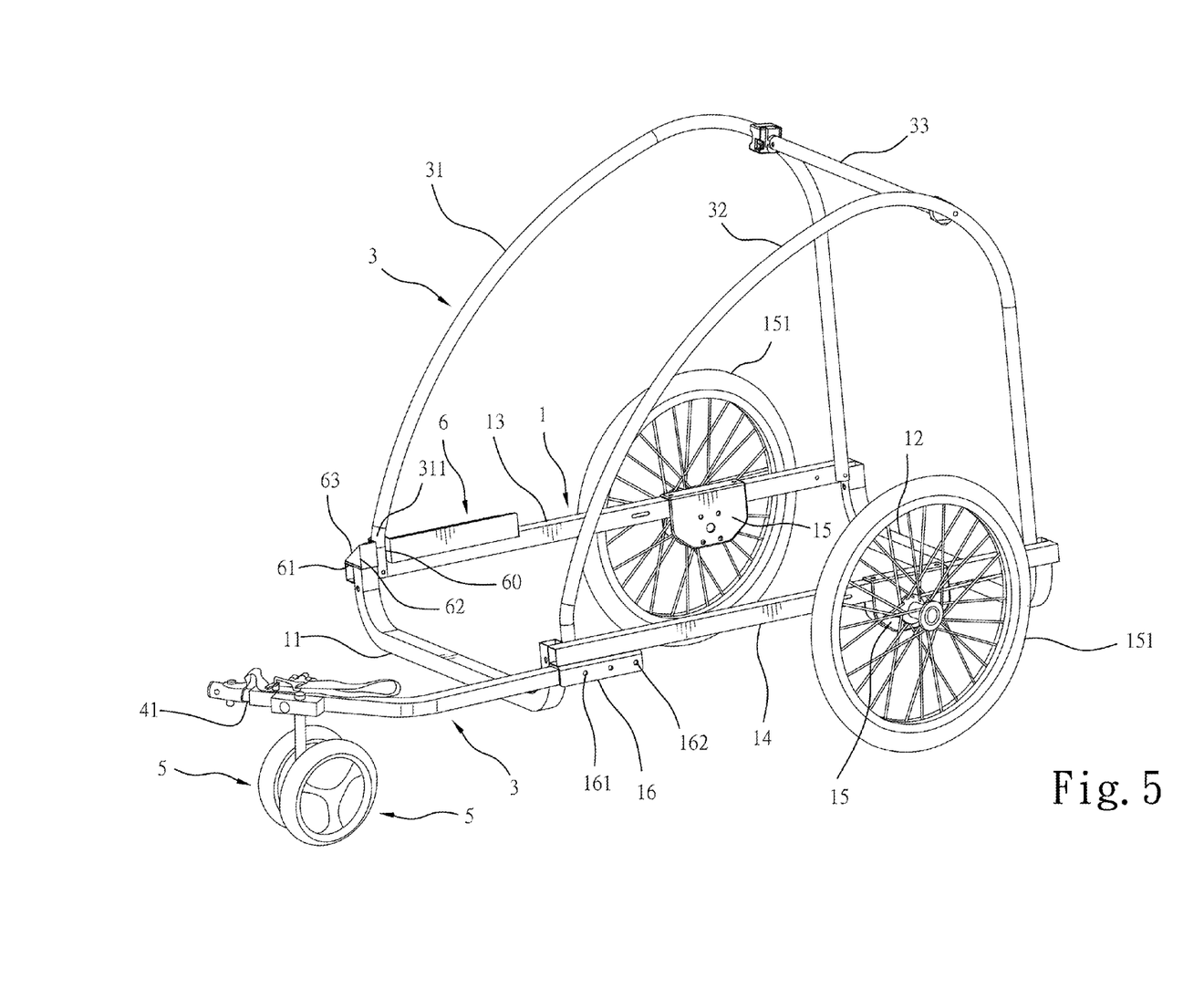
FIG. 5 is an elevational view of the present invention, illustrating the frame structure of the baby trailer safety structure equipped with wheels.
Figure 6:
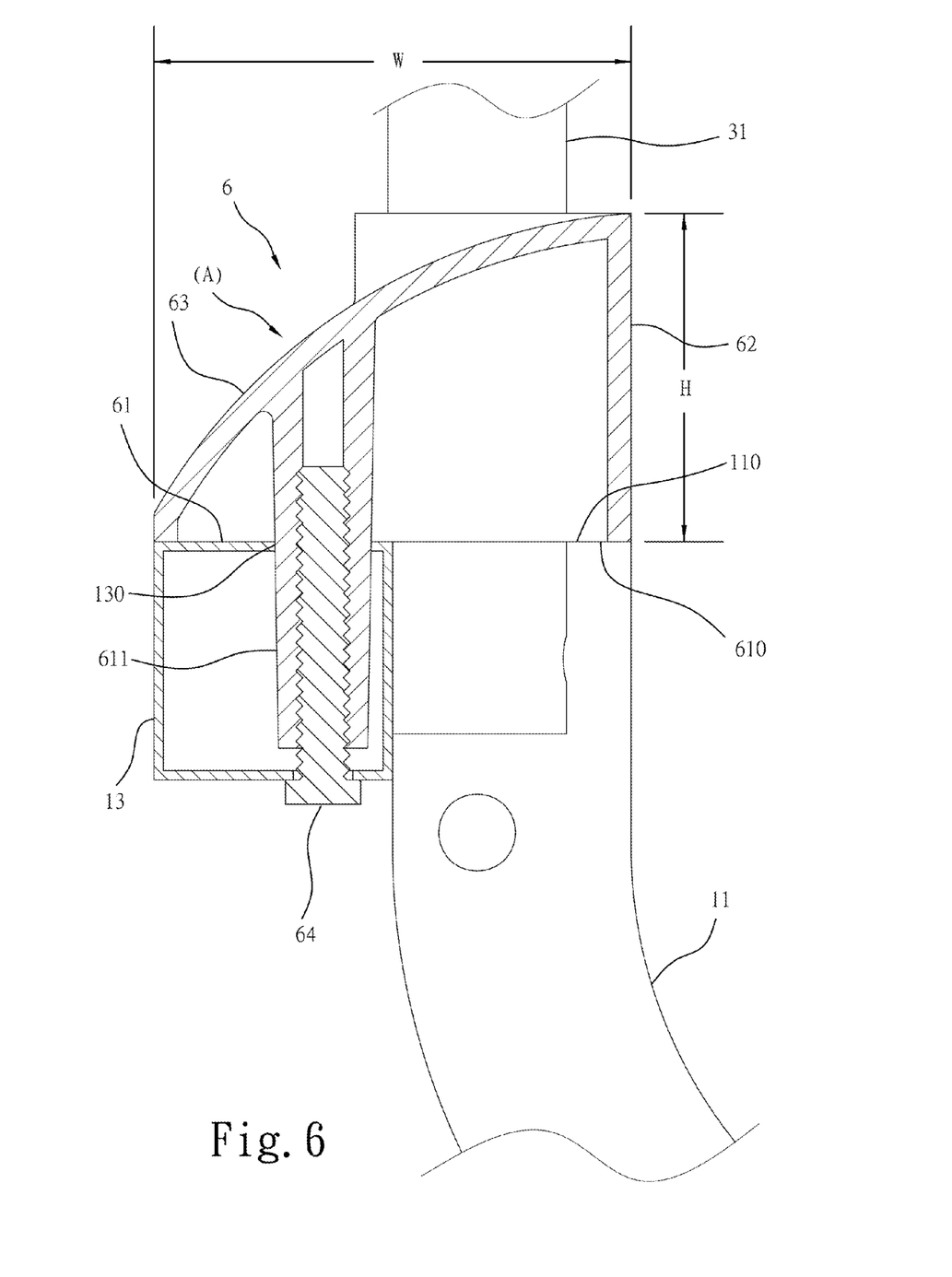
FIG. 6 is a sectional view, in an enlarged scale, of a part of the present invention.
Figure 7:
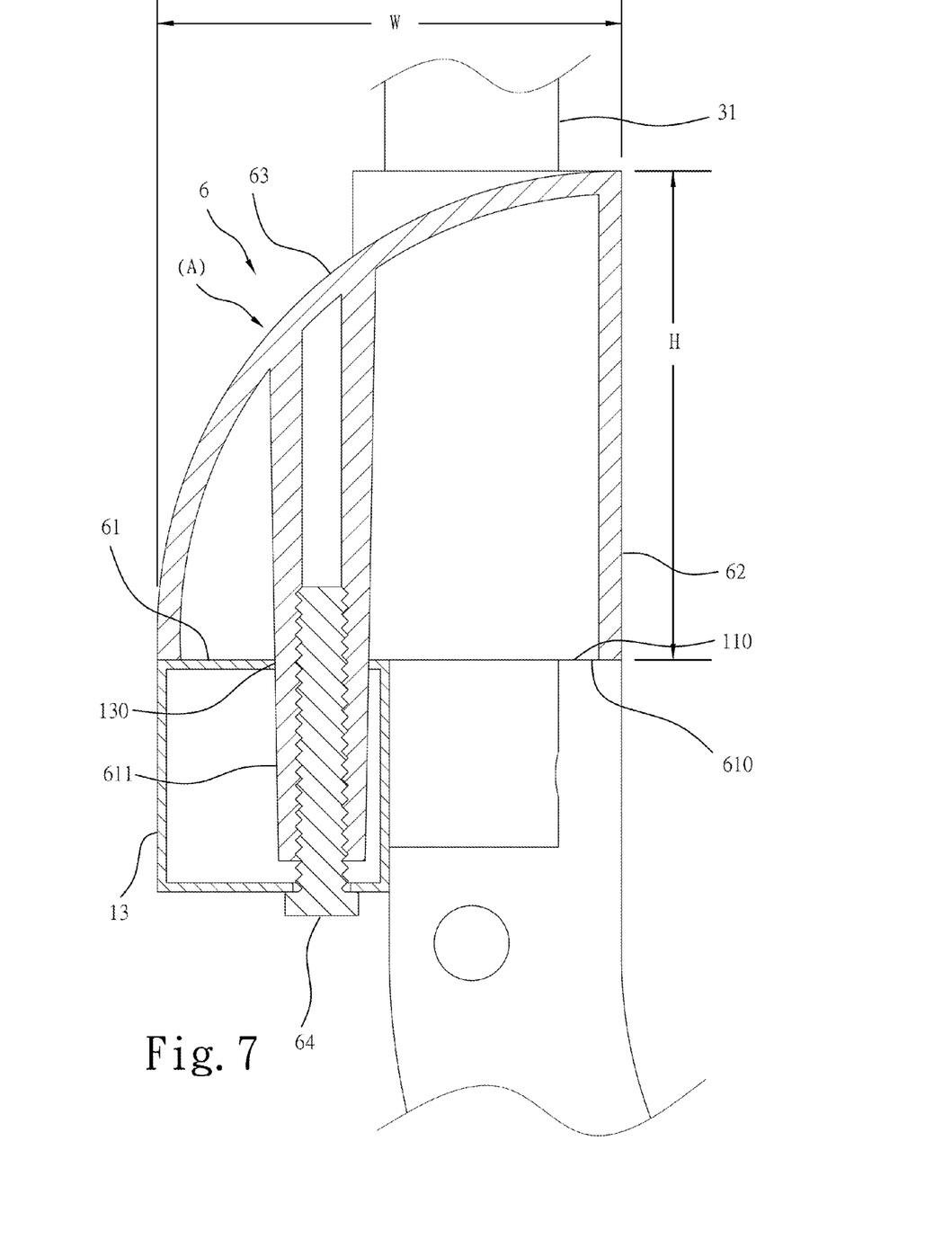
FIG. 7 is a schematic sectional view, in an enlarged scale, of a part of the present invention, illustrating an alternate form of the arc face of the sloping peripheral wall of the safety block.

Referring to FIGS. 3~5, a baby trailer safety structure in accordance with the present invention is shown having means to prohibit the young child carrying therein from standing up, comprising:

a bottom frame unit 1, which comprises a front bar 11, a rear bar 12, opposing sidebars 13;14 connected in parallel between the front bar 11 and the rear bar 12, two rear wheel holders 15 respectively mounted on the rear end of each of the sidebars 13;14 to support one respective rear wheel 151 (see FIG. 5), and a pivot holder 16 provided at the front bottom side of one sidebar 13 and having two locating holes 161;162 respectively disposed near front and rear ends thereof;

a top frame unit 3, which comprises two inverted U-bars 31;32 respectively connected to the front and rear ends of the front bar 11 and rear bar 12 of the bottom frame unit 1 and a transverse rod 33 transversely connected between the two inverted U-bars 31;32 on the middle; and a trailer bar 4, which has the rear end thereof pivotally connected to the pivot holder 16 at the sidebar 13 of the bottom frame unit 1 with a pivot pin 160, and the front end thereof fixedly mounted with a connector 41 that supports a front wheel assembly 5 and is connectable to a bicycle (not shown), wherein a lock pin (not shown) is mounted in the trailer bar 4 and selectively insertable into one of two locating holes 161;162 to lock the trailer bar 3 to the pivot holder 16 in the received or extended position.

Subject to the aforesaid arrangement, the baby trail can also be used as a baby cart. Further, the main feature of the baby trail of the present invention is outlined hereinafter.

A safety block 6 is fixedly mounted on the other sidebar 14 to prohibit a young child carrying in the baby trail from standing up on the associating sidebar 14. The safety block 6 comprises a bottom mounting wall 61, a vertical sidewall 62 and a sloping peripheral wall 63. The bottom mounting wall 61 is fixedly fastened to the sidebar 14. The vertical sidewall 62 extends vertically upwardly from one lateral side, namely, the inner lateral side of the bottom mounting wall 61. The sloping peripheral wall 63 extends downwardly from the topmost edge of the vertical sidewall 62 to the other lateral side, namely, the outer lateral side of the bottom mounting wall 61. Thus, a young child carrying in the baby trailer cannot stands up on the top side of the safety block 6, avoiding accidents and enhancing the safety level of the baby trailer.

Figure 10:
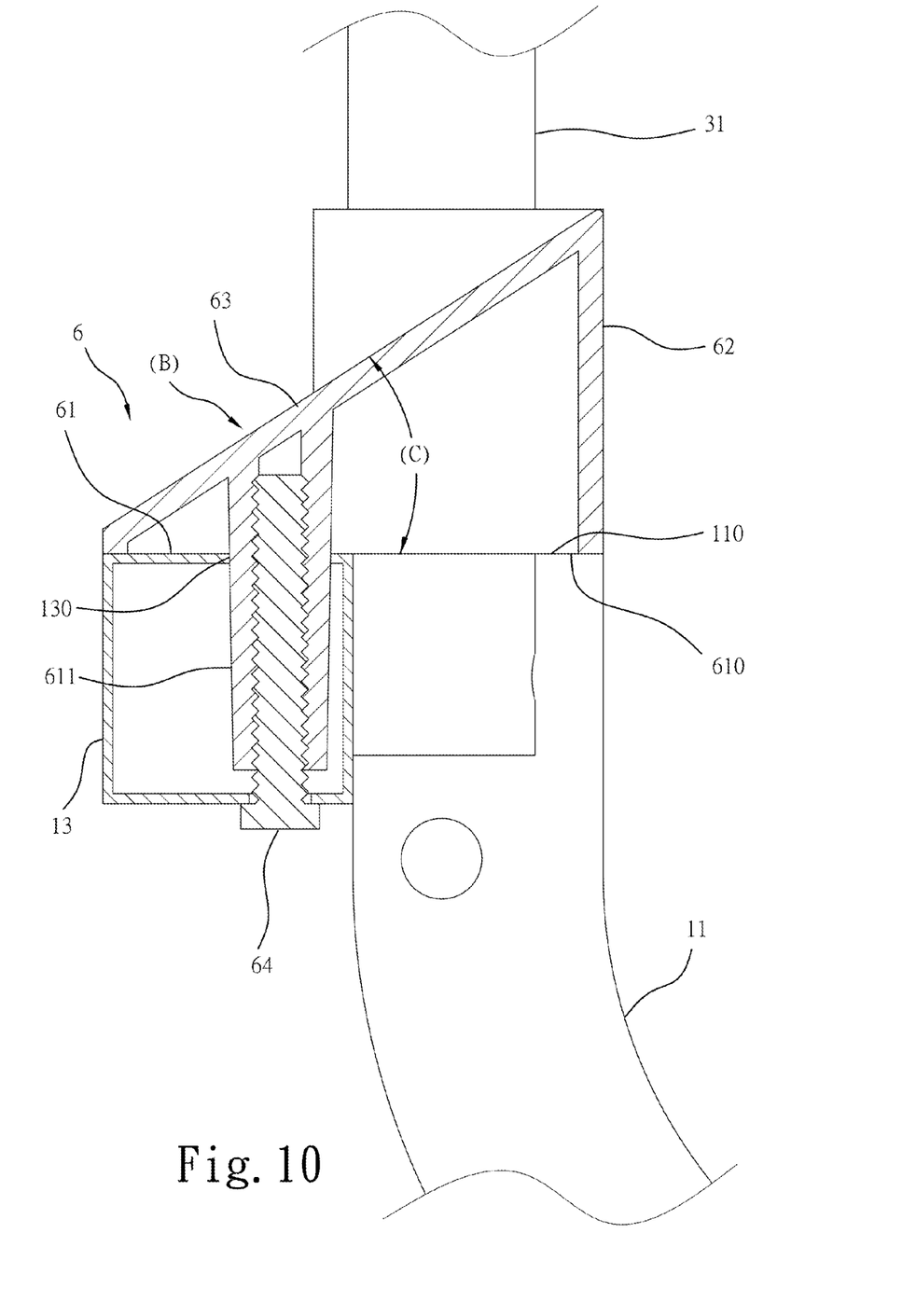
FIG. 10 is a schematic sectional view, in an enlarged scale, of a part of the present invention, illustrating still another alternate form of the safety block.

Further, the sloping peripheral wall 63 can be configured to provide an arc face A (see FIGS. 3~6) or beveled surface B (see FIG. 10). If the sloping peripheral wall 63 is configured to provide an arc face A, the arc of the arc face A must be not greater than ¼ of the true circle of which the radius is equal to the height H of the vertical sidewall 62, or not greater than ¼ of the true circle of which the radius is equal to the maximum width W of the bottom mounting wall 61. If the sloping peripheral wall 63 is configured to provide a beveled surface B, the contained angle C defined between the beveled surface B and the bottom mounting wall 61 must be equal to or greater than 25°.

Further, the bottom mounting wall 61 is fixedly fastened to the sidebar 14 by fastening members 64. Further, the safety block 6 comprises a plurality of bottom mounting pins 611 respectively downwardly extended from the bottom mounting wall 61 and inserted into respective mounting holes 130 on the sidebar 13 and affixed thereto by the fastening members 64, enhancing connection tightness.

Further, the inner part 610 of the bottom mounting wall 61 of the safety block 6 is stopped against the top edge 110 of one upwardly curved end of the front bar 11, enhancing positioning stability.

Further, the safety block 6 comprises a notch 60 for the passing of the front bottom end 311 of the associating inverted U-bar 31 that is connected to the front end of the front bar 11.

Further, the safety block 6 can be made of plastics, aluminum, aluminum alloy, iron or stainless steel.

Figure 8:
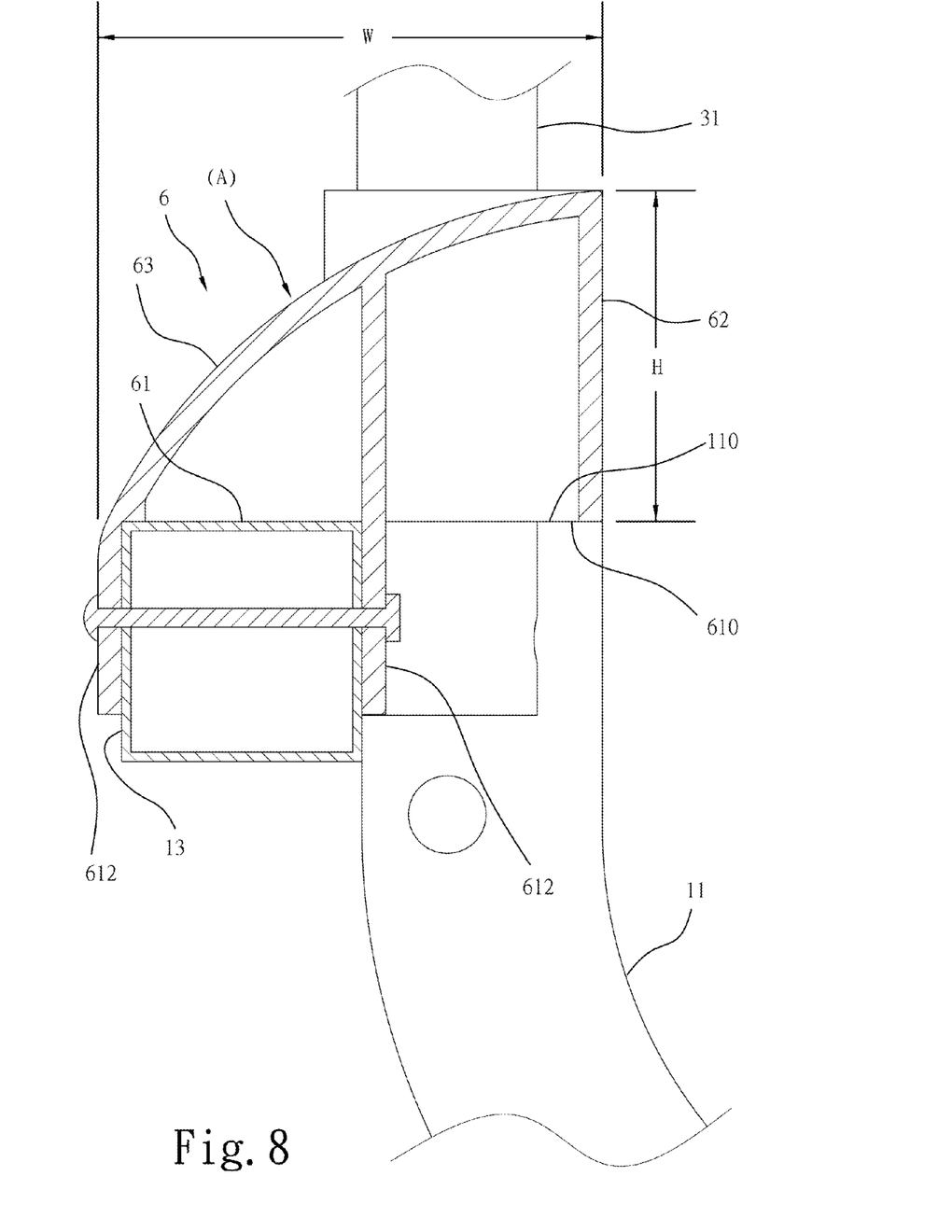
FIG. 8 is a schematic sectional view, in an enlarged scale, of a part of the present invention, illustrating an alternate form of the safety block.

Referring to FIG. 8, the safety block 6 can be made having two bottom mounting lugs 612 bilaterally downwardly extended from the bottom mounting wall 61 and respectively fastened to the two opposite lateral sidewalls of the sidebar 14 of the bottom frame unit 1 with fastening members 610. The bottom mounting lugs 612 can be formed integral with the bottom mounting wall 61. Alternatively, the bottom mounting lugs 612 can be separately made and then affixed to the bottom mounting wall 61 with fastening means.

Figure 9:
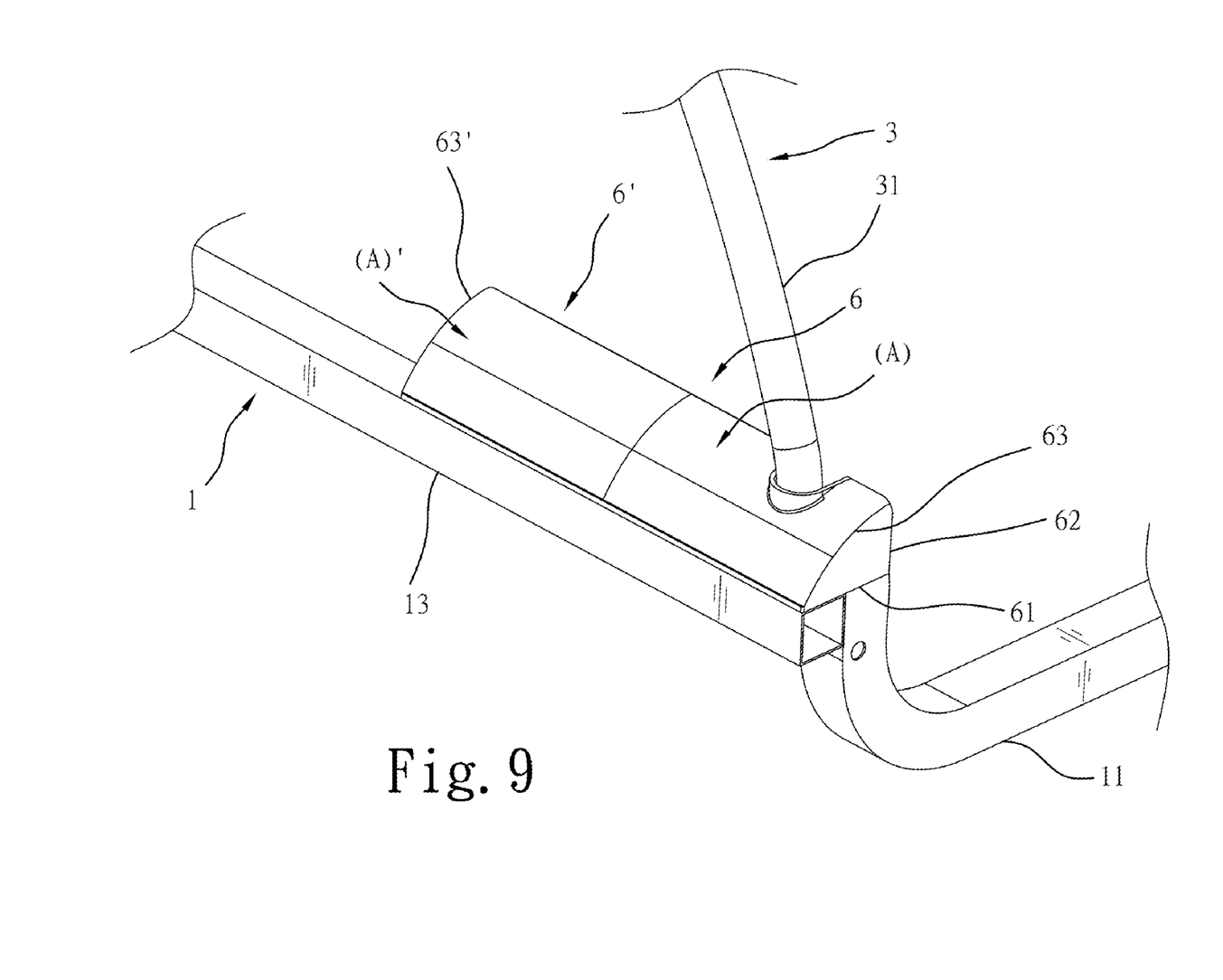
FIG. 9 is an elevational view, in an enlarged scale, of a part of the present invention, illustrating another alternate form of the safety block.

Referring to FIG. 9, the safety block 6 can be formed of a plurality of block elements 6;6' (see FIG. 9) that are abutted against each other when fastened to the sidebar 14 of the bottom frame unit 1. According to this embodiment, the arc faces A;A' of the sloping peripheral walls 63;63' each have a smooth surface, unlike the grained surface design of the arc face A of the sloping peripheral walls 63 of the safety block 6 shown in FIGS. 3~5.

As indicated above, the invention has the following advantages:

1. A safety block 6 is fixedly fastened to the sidebar 14 of the bottom frame unit 1 of the baby trailer, and the safety block 6 is configured to provide a sloping peripheral wall 63 that prohibits a young child carrying in the baby trailer from standing up on the sidewall 14, avoiding accidents and enhancing the safety level of the baby trailer.

2. When a test block member is pressed vertically downwardly onto the safety block 6 during a safety test, the test block member cannot be kept in position and will slope downwardly out of the safety block 6, and therefore the safety block 6 meets fully the test standards.

What is claimed is:

1. A baby trailer safety structure, comprising:
   a bottom frame unit, said bottom frame unit comprising a front bar, a rear bar, opposing first and second sidebars connected in parallel between said front bar and said rear bar, two rear wheel holders respectively mounted on a rear end of each of said first and second sidebars to support one respective rear wheel, and a pivot holder provided at a front bottom side of one of said first and second sidebars, said pivot holder having two locating holes respectively disposed near front and rear ends thereof;
   a top frame unit, said top frame unit comprising two inverted U-bars respectively connected to front and rear ends of the front bar and rear bar of said bottom frame unit and a transverse rod transversely connected between said two inverted U-bars on the middle thereof;
   a trailer bar, said trailer bar having a rear end thereof pivotally connected to the pivot holder at one of said first and second sidebar of said bottom frame with a pivot pin and a front end thereof fixedly mounted with a connector that supports a front wheel assembly and is connectable to a bicycle; and
   a lock pin mounted in said trailer bar and selectively insertable into one of said two locating holes to lock said trailer bar to said pivot holder in a received or extended position;
   wherein a safety block is fixedly mounted on one said sidebar of said bottom frame unit to prohibit a young child carrying in the baby trail from standing up on the associating sidebar, said safety block comprising a bottom mounting wall, a vertical sidewall and a sloping peripheral wall, said bottom mounting wall being fixedly fastened to the associating sidebar of said bottom frame unit, said vertical sidewall extending vertically upwardly from one an inner lateral side of said bottom mounting wall, said sloping peripheral wall extending downwardly from the topmost edge of said vertical sidewall to an outer lateral side of said bottom mounting wall.

2. The baby trailer safety structure as claimed in claim 1, wherein said sloping peripheral wall of said safety block comprises an arc face, said arc face being equal to or smaller than ¼ of the true circle of which the radius is equal to the height of said vertical sidewall.

3. The baby trailer safety structure as claimed in claim 1, wherein said sloping peripheral wall of said safety block comprises an arc face, said arc face being equal to or smaller than ¼ of the true circle of which the radius is equal to the maximum width of said bottom mounting wall.

4. The baby trailer safety structure as claimed in claim 1, wherein said loping peripheral wall is configured to provide a beveled surface, and the contained angle defined between said beveled surface and said bottom mounting wall is equal to or greater than 25°.

5. The baby trailer safety structure as claimed in claim 1, wherein said bottom mounting wall is fixedly fastened to one said sidebar of said bottom frame unit by a plurality of fastening members.

6. The baby trailer safety structure as claimed in claim 5, wherein said safety block comprises a plurality of bottom mounting pins respectively downwardly extended from the bottom mounting wall thereof and inserted into respective mounting holes on said sidebar and affixed thereto by said fastening members.

7. The baby trailer safety structure as claimed in claim 1, wherein said bottom mounting wall of said safety block has an inner part thereof stopped against a top edge of the associating end of said front bar of said base frame unit.

8. The baby trailer safety structure as claimed in claim 1, wherein said safety block comprises a notch for the passing of a front bottom end of the associating inverted U-bar of said top frame unit that is connected to said front bar of said base frame unit.

9. The baby trailer safety structure as claimed in claim 1, wherein said safety block comprises two bottom mounting lugs bilaterally downwardly extended from said bottom mounting wall and respectively fastened to two opposite lateral sidewalls of one said sidebar of said bottom frame unit with fastening members.

10. The baby trailer safety structure as claimed in claim 1, wherein said safety block is formed of multiple block members that are abutted against one another when fastened to one said sidebar of said bottom frame unit.

11. The baby trailer safety structure as claimed in claim 2, wherein said arc face of said sloping peripheral wall of said safety block has a smooth surface.

12. The baby trailer safety structure as claimed in claim 1, wherein said arc face of said sloping peripheral wall of said safety block has a grained design.

13. The baby trailer safety structure as claimed in claim 1, wherein said safety block comprises two bottom mounting lugs bilaterally affixed to said bottom mounting wall with first fastening members and respectively fastened to two opposite lateral sidewalls of one said sidebar of said bottom frame unit with second fastening members.

14. The baby trailer safety structure as claimed in claim 1, wherein said safety block is made of a material selected from the material group of plastics, aluminum, aluminum alloy, iron and stainless steel.

\* \* \* \* \*